United States Patent
Noda et al.

(10) Patent No.: US 10,982,951 B2
(45) Date of Patent: Apr. 20, 2021

(54) AXLE-LOAD MEASURING APPARATUS AND AXLE-LOAD MEASURING METHOD

(71) Applicant: Panasonic Intellectual Property Management Co., Ltd., Osaka (JP)

(72) Inventors: Akihiro Noda, Osaka (JP); Hiroya Kusaka, Hyogo (JP); Taro Imagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 16/384,987

(22) Filed: Apr. 16, 2019

(65) Prior Publication Data
US 2019/0242693 A1    Aug. 8, 2019

Related U.S. Application Data

(63) Continuation of application No. PCT/JP2017/034423, filed on Sep. 25, 2017.

(30) Foreign Application Priority Data

Feb. 28, 2017  (JP) .............................. JP2017-036232

(51) Int. Cl.
*G01B 11/16* (2006.01)
*G01G 19/02* (2006.01)
(Continued)

(52) U.S. Cl.
CPC .............. *G01B 11/16* (2013.01); *G01G 19/02* (2013.01); *G01G 19/022* (2013.01);
(Continued)

(58) Field of Classification Search
CPC ...... G01B 11/16; G01G 19/02; G01G 19/022; G01G 23/01; G06T 7/74;
(Continued)

(56) References Cited

U.S. PATENT DOCUMENTS

| | | | | |
|---|---|---|---|---|
| 5,392,034 A | * | 2/1995 | Kuwagaki | G08G 1/015 340/933 |
| 2003/0189500 A1 | * | 10/2003 | Lim | G08G 1/04 340/937 |

(Continued)

FOREIGN PATENT DOCUMENTS

| | | | |
|---|---|---|---|
| CN | 101696878 A | * | 4/2010 |
| EP | 1927827 A2 | | 6/2008 |

(Continued)

OTHER PUBLICATIONS

Richards, W. Lance. "A new correction technique for strain-gage measurements acquired in transient-temperature environments." (1996). (Year: 1996).*

(Continued)

*Primary Examiner* — Carol Wang
(74) *Attorney, Agent, or Firm* — McDermott Will and Emery LLP

(57) ABSTRACT

An axle-load measuring apparatus measures an axle load of a vehicle by using a captured image where a road and the vehicle on the road are imaged, and the axle-load measuring apparatus includes a displacement calculator, a correction information obtaining unit, and an axle-load calculator. The displacement calculator detects a displacement of the road by using the captured image. The displacement is caused by receiving the axle load. The correction information obtaining unit obtains correction information. An axle-load calculator calculates the axle load by using the displacement and the correction information.

8 Claims, 16 Drawing Sheets

(51) Int. Cl.
*G06T 7/73* (2017.01)
*G06K 9/00* (2006.01)
*G01G 23/01* (2006.01)

(52) U.S. Cl.
CPC ............ *G06K 9/00785* (2013.01); *G06T 7/74* (2017.01); *G01G 23/01* (2013.01); *G06T 2207/30184* (2013.01); *G06T 2207/30248* (2013.01)

(58) Field of Classification Search
CPC ........... G06T 2207/30248; G06T 2207/30184; G06K 9/00785; G06K 9/00624; G06K 9/40
See application file for complete search history.

(56) References Cited

U.S. PATENT DOCUMENTS

2011/0154907 A1* 6/2011 Schmidt ................. G01G 19/07
73/800
2015/0302260 A1* 10/2015 Kijima ................... G08G 1/166
701/70
2017/0098127 A1* 4/2017 Kobayashi ........... G06K 9/6292
2017/0307360 A1* 10/2017 Imai ......................... G06T 7/246

FOREIGN PATENT DOCUMENTS

| JP | 2010197249 A | * | 9/2010 |
|---|---|---|---|
| JP | 2011-064462 | | 3/2011 |
| JP | 2013-007624 | | 1/2013 |
| JP | 2017-058177 | | 3/2017 |

OTHER PUBLICATIONS

Translated Version of CN101696878A (Year: 2010).*
Translated Version of JP 2010-197249A (Year: 2010).*
Translated Version of JP 2017-058177A (Year: 2017).*
The Extended European Search Report dated Mar. 4, 2020 for the related European Patent Application No. 17898398.7.
International Search Report of PCT application No. PCT/JP2017/034423 dated Nov. 28, 2017.

* cited by examiner

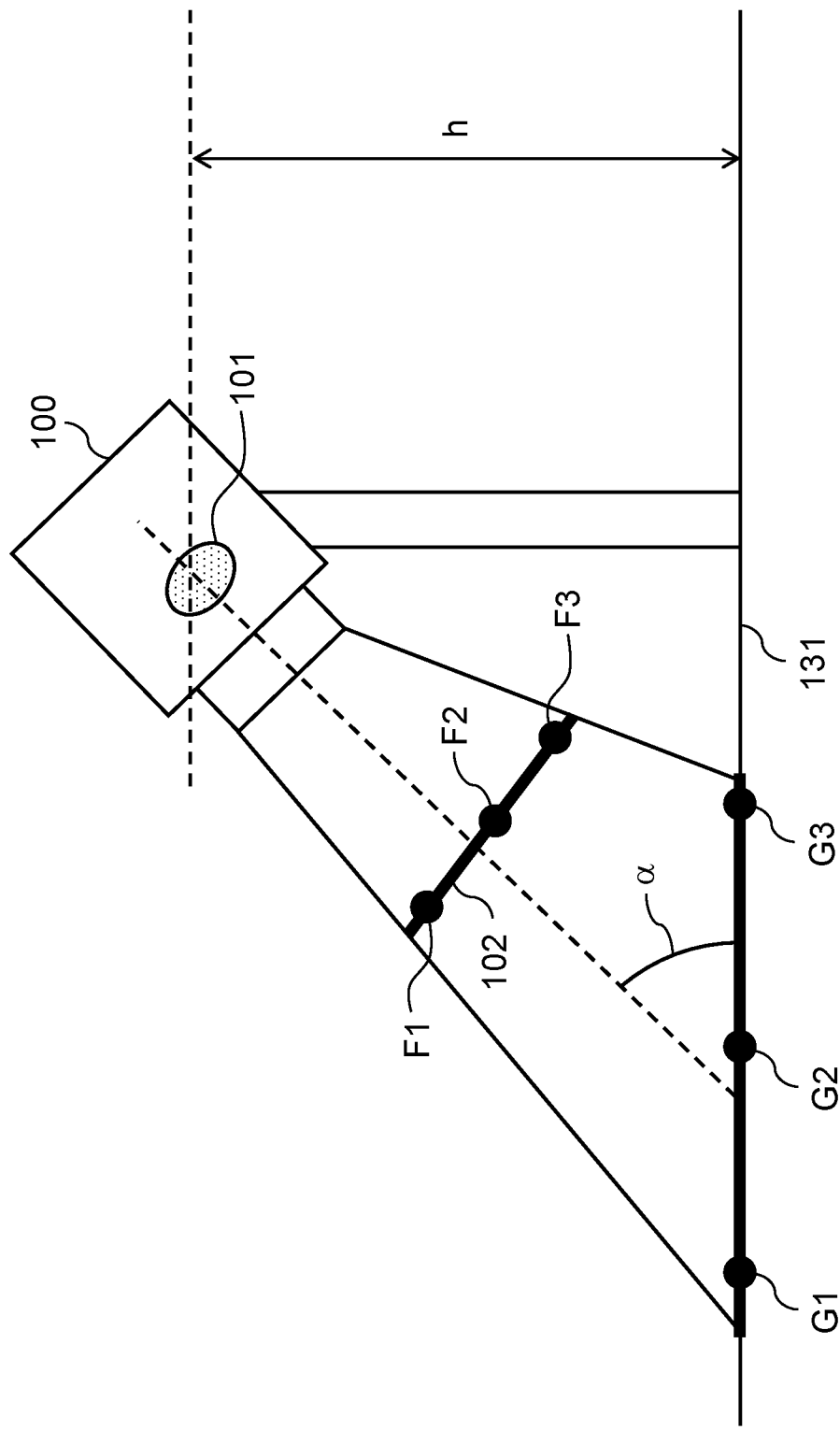

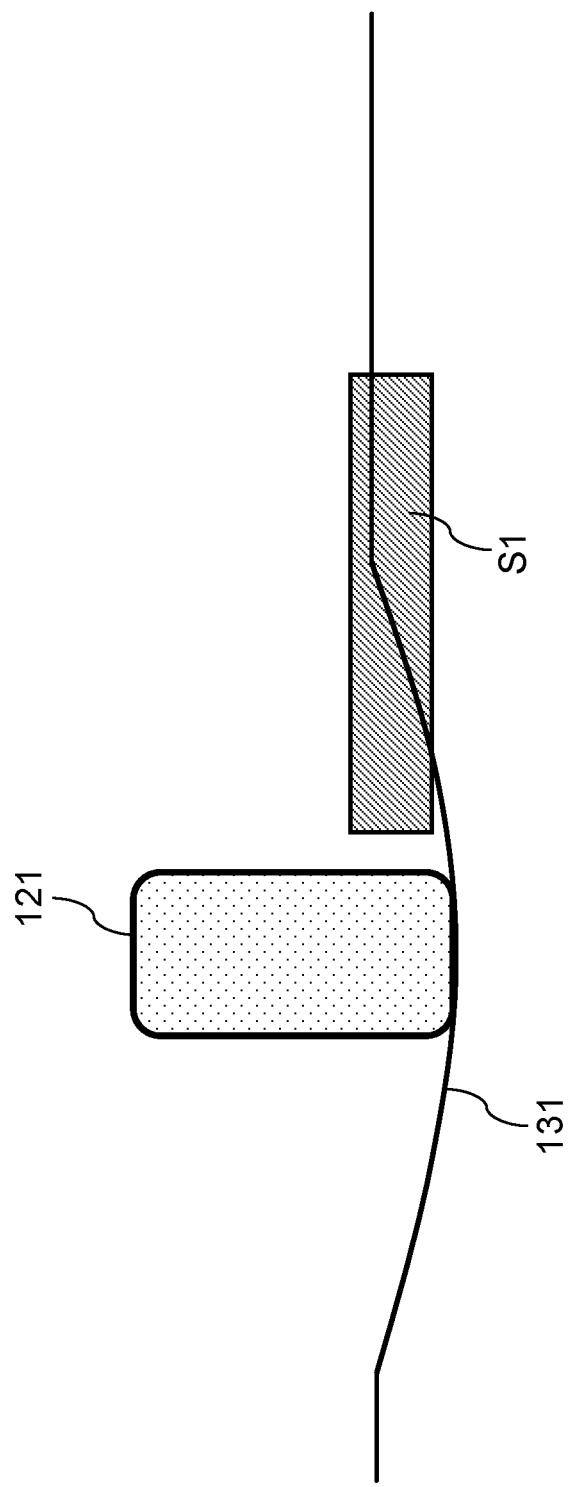

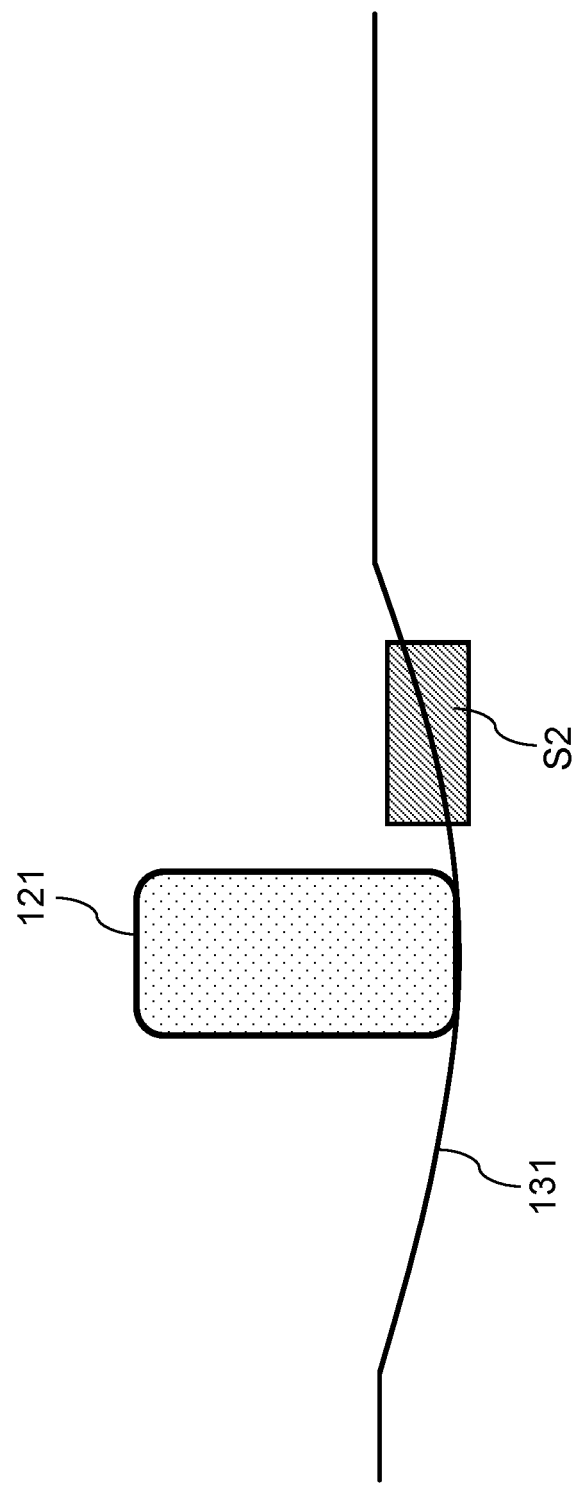

AXLE-LOAD MEASURING APPARATUS AND AXLE-LOAD MEASURING METHOD

TECHNICAL FIELD

The present disclosure relates to an axle-load measuring apparatus and an axle-load measuring method for measuring an axle load of a vehicle from a captured image where a vehicle passing on a road is imaged.

BACKGROUND ART

PTL 1 discloses an axle-load measuring apparatus. This axle-load measuring apparatus previously stores as known data a vehicle number, a known axle load, and a known gross weight of a vehicle to be examined, and in addition, previously stores an acceptable range of an error in an axle load and an acceptable range of an error in a gross weight as data for determination, which is used to determine measurement accuracy. The axle-load measuring apparatus uses an imaging camera to take an image of a vehicle registration plate of a running vehicle and reads a vehicle number to identify the vehicle to be examined; and, with respect to the identified vehicle to be examined, the axle-load measuring apparatus calculates, based on a load sensor, an error between a measured axle load and the known axle load and an error between a measured gross weight and the known gross weight. Then, the axle-load measuring apparatus determines measurement accuracy, depending on whether the errors are within the acceptable ranges.

CITATION LIST

Patent Literature

PTL 1: Unexamined Japanese Patent Publication No. 2013-7624

SUMMARY

The present disclosure provides an axle-load measuring apparatus and an axle-load measuring method for highly accurately measuring an axle load of a vehicle from a captured image where the vehicle passing on a road is imaged.

An axle-load measuring apparatus according to one aspect of the present disclosure measures an axle load of a vehicle by using a captured image where a road and the vehicle on the road are imaged, and the axle-load measuring apparatus includes a displacement calculator, a correction information obtaining unit, and an axle-load calculator. The displacement calculator detects a displacement of the road by using the captured image. The displacement is caused by receiving the axle load. The correction information obtaining unit obtains correction information. The axle-load calculator calculates the axle load by using the displacement and the correction information.

An axle-load measuring method according to an aspect of the present disclosure measures an axle load of a vehicle by using a captured image where a road and the vehicle on the road are imaged, and the axle-load measuring method includes a displacement calculation step, a correction information obtaining step, and an axle-load calculation step. The displacement calculation step is a step of detecting a displacement of the road by using the captured image. The displacement is caused by receiving the axle load. The correction information obtaining step is a step of obtaining correction information. The axle-load calculation step is a step of calculating the axle load by using the displacement and the correction information.

With the above axle-load measuring apparatus and axle-load measuring method according to the present disclosure, it is possible to highly accurately measure an axle load of a vehicle from a captured image where the vehicle passing on a road is imaged.

BRIEF DESCRIPTION OF DRAWINGS

FIG. 3 is a diagram illustrating spatial information.

FIG. 6A is a schematic diagram showing an example of a set area.

FIG. 6B is a schematic diagram showing another example of a set area.

DESCRIPTION OF EMBODIMENTS

An axle-load measuring apparatus according to one aspect of an exemplary embodiment measures an axle load of a vehicle by using a captured image where a road and the vehicle on the road are imaged, and the axle-load measuring apparatus includes a displacement calculator, a correction information obtaining unit, and an axle-load calculator. The displacement calculator detects a displacement of the road caused by the axle load in the captured image. The correction information obtaining unit obtains correction information. The axle-load calculator calculates the axle load by using the displacement and the correction information.

Hereinafter, a specific example of an axle-load measuring apparatus according to one aspect of the present disclosure will be described. Note that each of the exemplary embodiments to be described below illustrates a preferred specific example of the present disclosure. Numerical values, shapes, materials, components, arrangement positions and connection configurations of the components, steps, processing order of the steps, and the like shown in the following exemplary embodiments are just examples, and are not intended to limit the present disclosure. The present disclosure is limited only by the scope of the claims. Therefore, among the components in the following exemplary embodiments, components not described in any of independent claims indicating the most generic concept of the present disclosure are not essential for achieving the object of the present disclosure but are described as components constituting a further preferable configuration.

First Exemplary Embodiment

Here, as one aspect of the present disclosure, a description will be given on an axle-load measuring system that is installed on a road for general vehicles and measures a displacement of the road caused by an axle load of a passing vehicle and that measures an axle load of the vehicle from the measured displacement

[1. Configuration]

Figure 1:
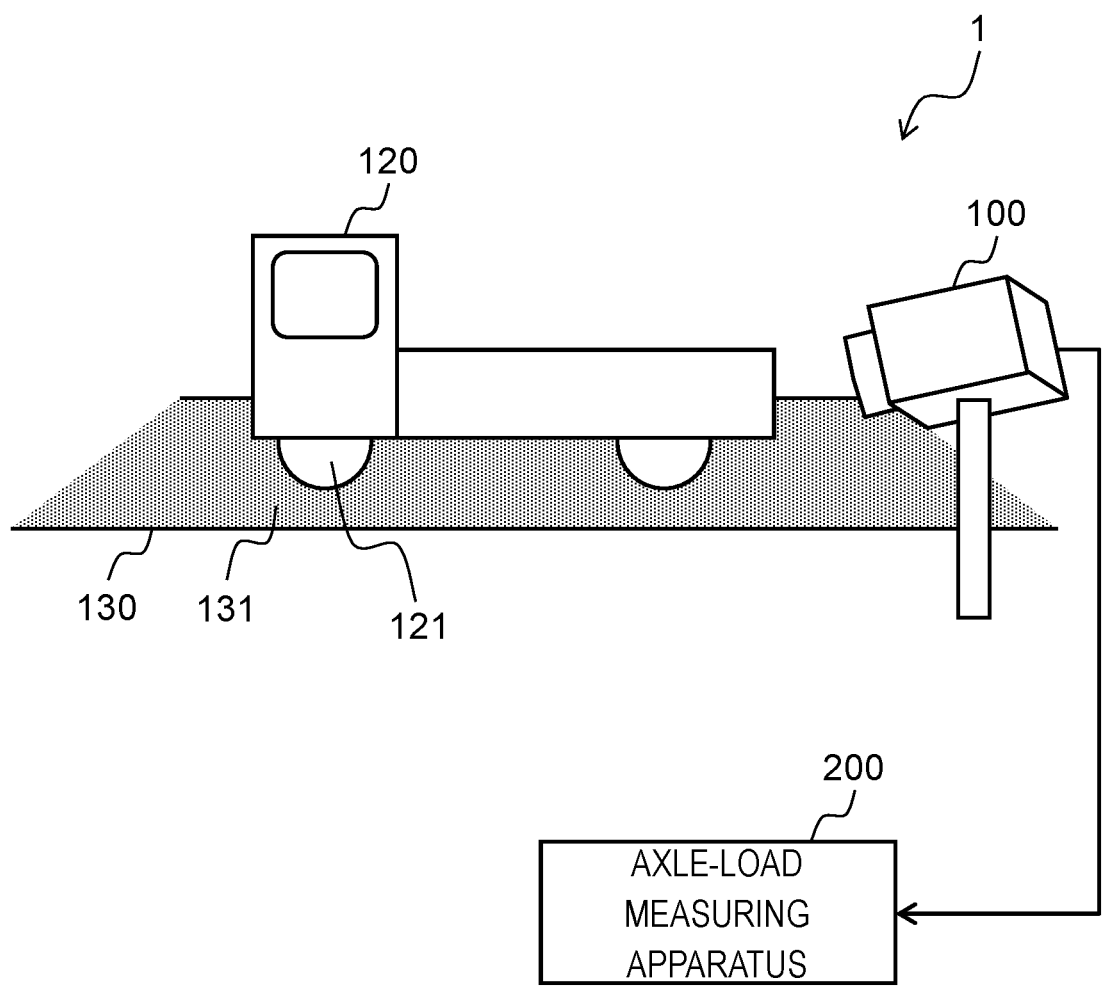
FIG. 1 is an outer appearance view schematically showing an example of how a displacement is measured.

FIG. 1 is an outer appearance view schematically illustrating one example of how to measure an axle load according to the first exemplary embodiment of the present disclosure.

As shown in FIG. 1, axle-load measuring system 1 is configured with imaging device 100 and axle-load measuring apparatus 200. Road surface 131 of road 130 is displaced by receiving a load from a contact surface between tire 121 of vehicle 120 and road surface 131. The displacement of road surface 131 changes, being affected by a state of tire 121, atmospheric temperature, temperature of road surface 131, running speed of vehicle 120, and the like.

In this exemplary embodiment, for example, axle-load measuring apparatus 200 is connected to imaging device 100 that images road 130 on which vehicle 120 is running. With this arrangement, a plurality of captured images generated by imaging device 100 are input into axle-load measuring apparatus 200. Further, axle-load measuring apparatus 200 obtains various kinds of information that affect the road surface displacement, from a captured image or an external device. Inputting of captured images and obtaining of information are performed through communication by radio or wire or through a recording medium. Axle-load measuring apparatus 200 measures the road surface displacement of road 130 from the input captured images and information. Axle-load measuring apparatus 200 measures the axle load of vehicle 120 by using the measured road surface displacement and the obtained information.

[1-1. Axle-Load Measuring Apparatus]

Figure 2:
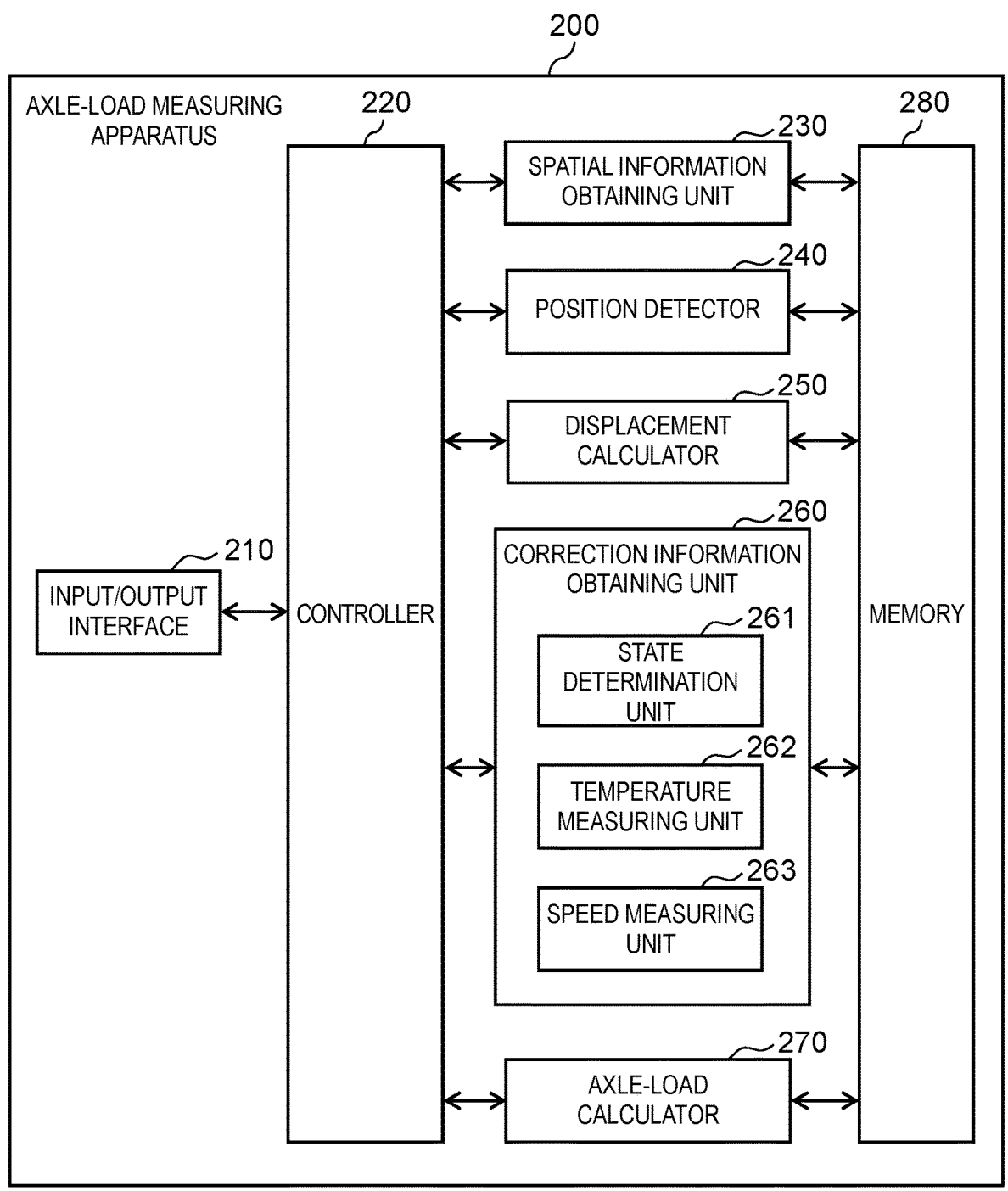
FIG. 2 is a block diagram showing a configuration of an axle-load measuring apparatus according to a first exemplary embodiment.

FIG. 2 is a block diagram illustrating a configuration of axle-load measuring apparatus 200 according to the first exemplary embodiment of the present disclosure.

As shown in FIG. 2, axle-load measuring apparatus 200 includes input/output interface 210, controller 220, spatial information obtaining unit 230, position detector 240, displacement calculator 250, correction information obtaining unit 260, axle-load calculator 270, and memory 280. Further, correction information obtaining unit 260 includes state determination unit 261, temperature measuring unit 262, and speed measuring unit 263.

Axle-load measuring apparatus 200 is realized by, for example, a microprocessor such as a CPU (Central Processing Unit) executing a program stored in memory 280.

Input/output interface 210 receives input of captured images generated by imaging device 100. For example, input/output interface 210 receives the input of 4096×2160 pixel digital image. Input/output interface 210 outputs the received captured images to controller 220. Input/output interface 210 receives captured images generated by an imaging device other than imaging device 100 and various kinds of information having been output by other devices.

Controller 220 controls an operation of each unit. Controller 220 has, for example, a non-volatile memory storing a program, a volatile memory serving as a temporary storage area for executing a program, an input/output port, a processor that executes a program, and other components.

Spatial information obtaining unit 230 obtains spatial information of road surface 131 by using a captured image where vehicle 120 is not imaged.

FIG. 3 is a diagram illustrating spatial information. As shown in FIG. 3, spatial information obtaining unit 230 uses installation information that is stored in memory 280 and indicates a height h of imaging element 101 of imaging device 100 from road surface 131, an angle of view (for example, 4096×2160 pixels), a tilt a of imaging element 101 with respect to road surface 131, and other information. Spatial information obtaining unit 230 calculates spatial information by calculating which point on the captured image each point on road surface 131 is projected onto. Here, spatial information obtaining unit 230 may calculate spatial information by calculating which point on imaginary projection plane 102 each point on road surface 131 is projected onto. The spatial information in the present disclosure represents the actual length for one pixel at individual points. The spatial information is used to correct an issue that the actual length for one pixel on the captured image is different among individual points. Spatial information obtaining unit 230 calculates the spatial information by using a perspective projection method or other methods.

With respect to FIG. 3, points G1, G2, and G3 on road surface 131 respectively correspond to points F1, F2, and F3 on projection plane 102. The same-length pixel is displayed at each of points F3 and F1 on the captured image, where point F3 is a projection of point G3 on road surface 131 close to imaging device 100, and point F1 is a projection of point G1 on road surface 131 distant from imaging device 100. However, the actual lengths are different. Further, the actual length for one pixel at point F2, which is a projection of point G2 at a midpoint between point G1 and point G3 on road surface 131, is also different from the actual length for one pixel of each of point F1 and point F3. This is because each of points G1, G2, and G3 is projected to be smaller on the captured image as the distance between imaging device 100 and each of points G1, G2, and G3 is larger.

Position detector 240 takes out, in a photographing time order, a plurality of captured images stored in memory 280 and detects a position of the tire in each captured image. As a method of detecting the tire position on the captured image, position detector 240 can use a commonly used technique such as an image recognition technology, a template matching method, a machine learning method, and a neural network. Accuracy of position detection may be in pixel units or may be sub-pixel units.

Displacement calculator 250 takes out a plurality of captured images stored in memory 280 in a photographing time order. Then, displacement calculator 250 calculates the displacement of road surface 131 by using an image in a detection area set in the captured image, the actual length for one pixel, at individual points, calculated by spatial information obtaining unit 230, and the tire position detected by position detector 240. Displacement calculator 250 can use, as the method for detecting a displacement in the captured image, a commonly used displacement detection method such as block matching, a correlation method, a sampling moire method, and a feature point tracking method. Here, examples of the correlation method include a normalized cross correlation method, a phase correlation method, and a laser speckle correlation method. Accuracy of displacement detection may be in pixel units or may be in sub-pixel units.

Correction information obtaining unit 260 obtains correction information for correction of an axle load.

State determination unit 261 determines the state of a tire. State determination unit 261 can determine the state of a tire, for example, from the captured images where vehicle 120 is imaged from the front and the side, by image recognition. The captured image to be used by state determination unit 261 for determination may be generated by imaging device 100 or may be generated by other imaging devices. State determination unit 261 determines the number of tires on one axle, a spacing between tires, a contact area with the road surface, a wheel base, and the like. Note that state determination unit 261 may determine a vehicle model from the captured image by image recognition and may thus determine the state of the tire, based on the vehicle model.

In this operation, state determination unit 261 may determine the state of the tire by using information stored in memory 280 and in association with vehicle models. In more detail, state determination unit 261 may obtain, as the correction information, information indicating at least one of the following pieces of information: a width of a tire of vehicle 120, the number of the tires on each of axles of vehicle 120, and information indicating a distance between the axles of vehicle 120.

Further, state determination unit 261 may determine the state of the tire from information received from a pressure sensor or a laser sensor installed on road 130.

Figure 4A:
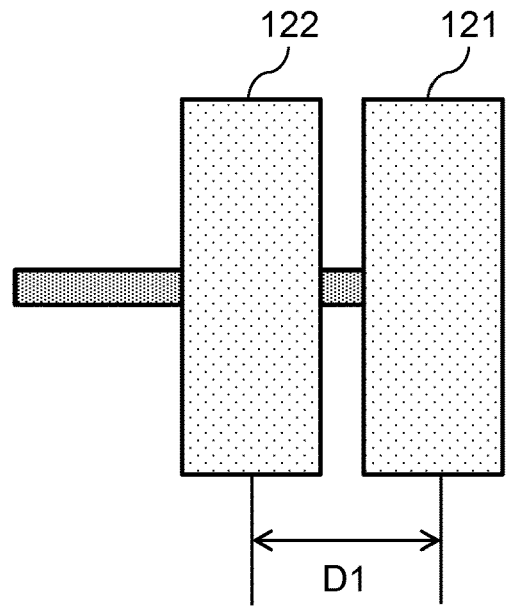
FIG. 4A is a schematic diagram of an axle when viewed from the front of a vehicle.
Figure 4B:
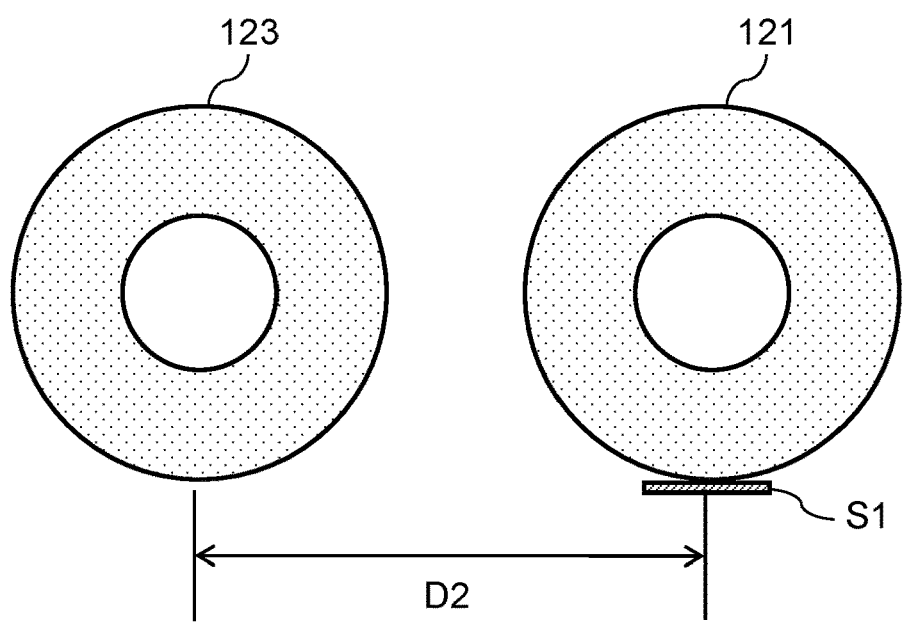
FIG. 4B is a schematic diagram showing a state of tires when the vehicle is viewed from side.

FIG. 4A is a schematic diagram of an axle of rear wheels when viewed from the front of a vehicle 120. FIG. 4B is a schematic diagram showing the state of the tires when vehicle 120 is viewed from the side.

FIG. 4A shows the rear wheels of vehicle 120. With respect to FIG. 4A, tires 121, 122 are connected to one end of a single axle. A wheel separation distance between tire 121 and tire 122 is a distance D1. FIG. 4B shows that a wheel base between tire 123 of the front wheel and tire 121 of the rear wheel of vehicle 120 is a distance D2. Further, FIG. 4B shows that a contact area between tire 121 and road surface is S1.

Temperature measuring unit 262 measures an external atmospheric temperature and a road surface temperature. Temperature measuring unit 262 may obtain a temperature measured by a thermometer or a thermocouple installed on road 130. Alternatively, temperature measuring unit 262 may obtain a temperature from a captured image generated by a thermal camera.

Speed measuring unit 263 takes out a plurality of captured images stored in memory 280 in a photographing time order. Then, speed measuring unit 263 measures a running speed of vehicle 120 by using optical flow, a template matching method, a background difference method, or other methods. Speed measuring unit 263 may obtain the running speed from an embedded sensor, a laser sensor, or an acoustic wave sensor, or other sensors installed in road 130.

Axle-load calculator 270 calculates the axle load of vehicle 120 passing on road 130, by using the displacement of road 130 detected by displacement calculator 250 and the correction information obtained by correction information obtaining unit 260.

Memory 280 stores captured images and various kinds of information having been input from input/output interface 210. Memory 280 stores the installation information of imaging device 100. Memory 280 is also used as a working memory for each unit. For example, memory 280 stores the spatial information obtained by spatial information obtaining unit 230. Memory 280 stores the positional information of tire 121 detected by position detector 240. Memory 280 stores the road surface displacement calculated by displacement calculator 250. Memory 280 stores the correction information obtained by correction information obtaining unit 260. Memory 280 stores a tire state determined by state determination unit 261. Memory 280 stores the external atmospheric temperature and the road surface temperature measured by temperature measuring unit 262. Memory 280 stores the running speed of vehicle 120 measured by speed measuring unit 263. Memory 280 stores the axle load calculated by axle-load calculator 270. Memory 280 is configured with, for example, a high-speed operable semiconductor storage element such as a DRAM (Dynamic Random Access Memory) or the like.

[2. Operation]

[2-1. Overall Operation]

Figure 5:
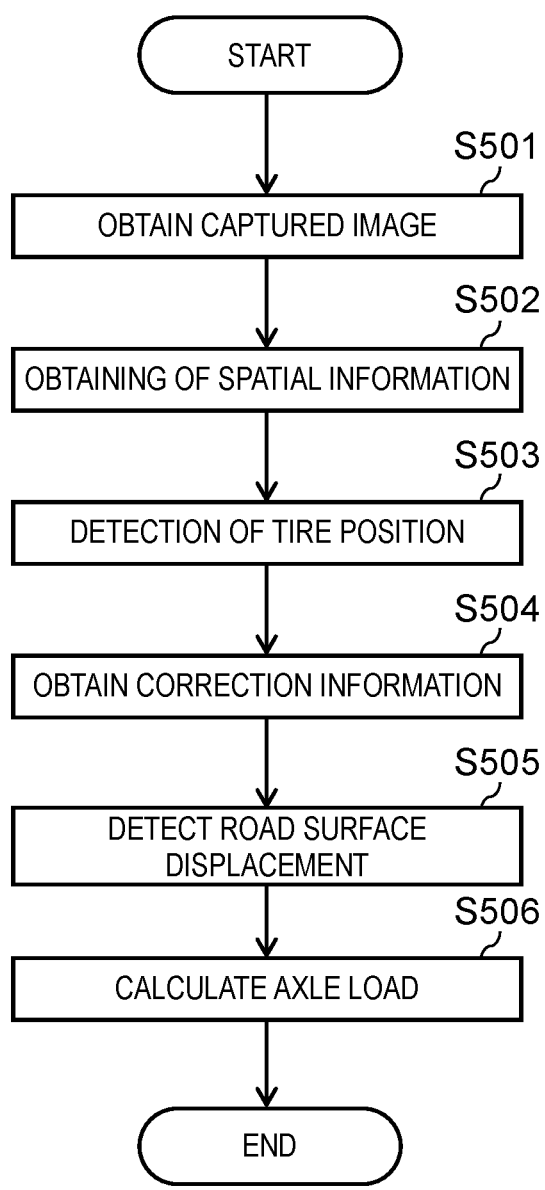
FIG. 5 is a flowchart showing an operation of the axle-load measuring apparatus.

FIG. 5 is a flowchart showing an operation of axle-load measuring apparatus 200 according to the first exemplary embodiment.

Controller 220 obtains a captured image from imaging device 100. Controller 220 obtains the captured image generated by imaging device 100 via input/output interface 210. Then controller 220 stores the captured image in memory 280 (step S501).

Controller 220 causes spatial information obtaining unit 230 to obtain the spatial information (step S502). Spatial information obtaining unit 230 obtains the spatial information by using a captured image and installation information of imaging device 100 stored in memory 280.

Controller 220 causes position detector 240 to detect the position of tire 121, in the captured image (step S503).

Controller 220 causes correction information obtaining unit 260 to obtain information necessary to calculate the axle load (step S504). Correction information obtaining unit 260 causes a part of or all of state determination unit 261, temperature measuring unit 262, and speed measuring unit 263 to obtain information necessary for axle-load measurement and stores the information in memory 280 as the correction information. State determination unit 261, temperature measuring unit 262, and speed measuring unit 263 obtain the correction information necessary for axle-load measurement by using captured images or the like stored in memory 280.

Controller 220 causes displacement calculator 250 to calculate the displacement of road surface 131 by using the captured image (step S505).

Controller 220 causes axle-load calculator 270 to calculate the axle load of vehicle 120 by using the displacement calculated by displacement calculator 250 and the correction information obtained by correction information obtaining unit 260 (step S506).

[2-2. Displacement Detection]

First, displacement calculator 250 sets a size of a detection area for detecting a displacement in a captured image. Controller 220 may set a plurality of area sizes at a position arbitrarily set based on the tire position detected by position detector 240 and may determine the area size of the detection area, based on results of displacements calculated for the individual area sizes. Further, controller 220 may set a plurality of positions based on the tire position and may determine the area size of the detection area by using an average value or a median value of results of displacements in the detection areas set at the individual positions.

FIG. 6A is a schematic diagram showing an example of a set area. FIG. 6B is a schematic diagram showing another example of a set area.

FIGS. 6A and 6B each show that road surface 131, which is in contact with tire 121 of a vehicle running on road 130, is displaced due to the axle load of the vehicle (see FIG. 1). In addition, FIG. 6A shows that area S1 is set as the detection area by controller 220. Further, FIG. 6B shows that area S2 is set as the detection area by controller 220.

Figure 7:
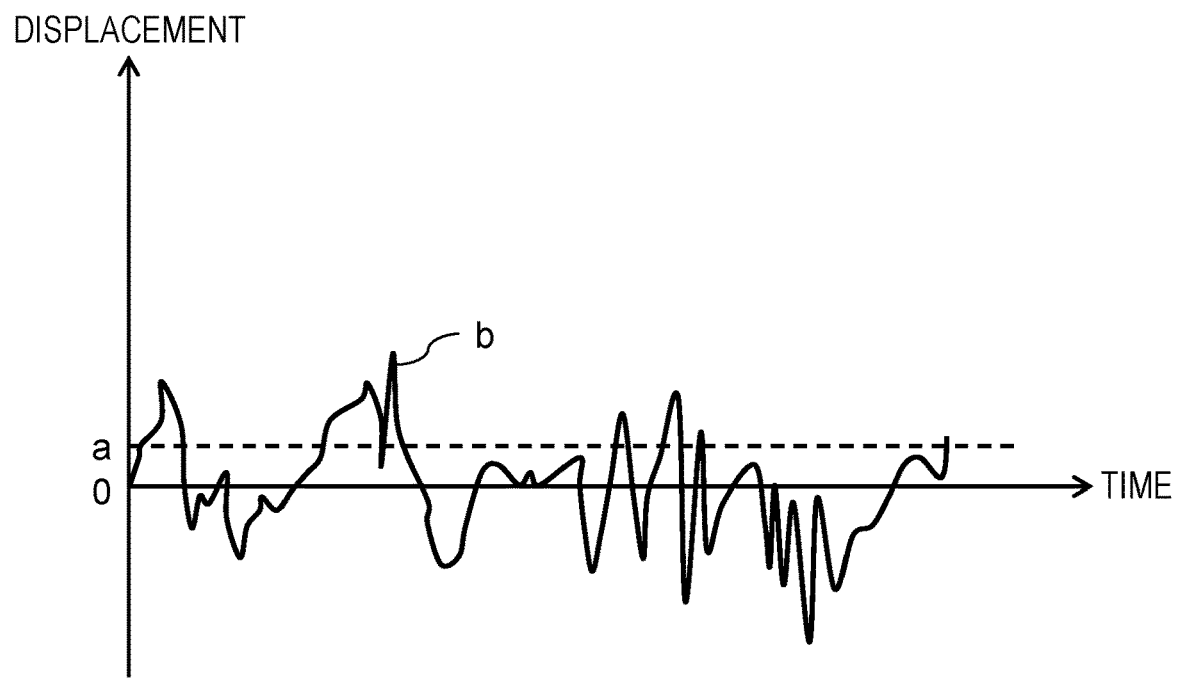
FIG. 7 is a diagram illustrating noise in a captured image.
Figure 8:
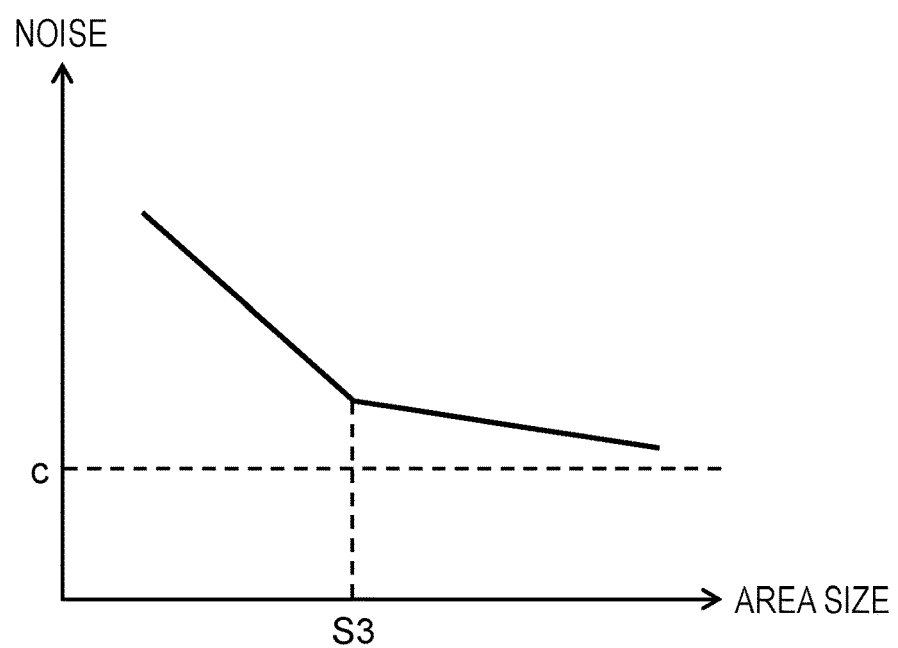
FIG. 8 is a diagram illustrating a relationship between noise and an area size.

FIG. 7 is a diagram illustrating noise in a captured image. FIG. 8 is a diagram illustrating a relationship between noise and an area size. In FIG. 7, the vertical axis represents a displacement, and the horizontal axis represents time. In FIG. 8, the vertical axis represents noise, the horizontal axis represents an area size.

FIG. 7 shows, in order of the image capturing time, displacements detected with respect to a plurality of captured images that do not include a vehicle. In this case, no displacement is detected among the captured images, so that the result of calculating the displacement is 0 at each time. Actually, as shown in FIG. 7, a displacement b is calculated as a noise component, due to noises of imaging element 101 (see FIG. 3), atmospheric fluctuation, and the like. Thus, for example, a variance of the displacement b can be considered to be noise. Note that instead of a variance, a standard deviation may be considered as noise.

Such noise is generally white noise. For this reason, in the template matching method, when the area size is made large as area S1 of FIG. 6A, the noise is normalized, and the noise therefore affects less as shown in FIG. 8. That is, as the area size is made larger, the noise gets closer to the saturation value c. On the other hand, when a proportion of a region where a displacement is caused to a region of the detection area is made large as area S2 of FIG. 6B, a sensitivity of displacement is improved.

Figure 9:
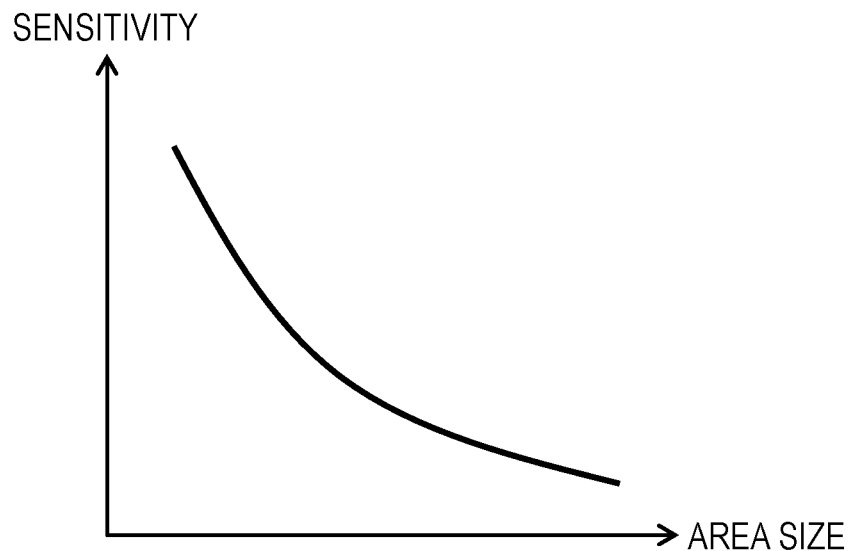
FIG. 9 is a diagram illustrating a relationship between a sensitivity of displacement detection and the area size.

Further, as shown in FIG. 9, the sensitivity of displacement detection becomes lower, as the area size becomes larger. FIG. 9 is a diagram illustrating a relationship between the sensitivity of displacement detection and the area size. With reference to FIG. 9, the vertical axis represents sensitivity, and the horizontal axis represents an area size. When the area size is large, a proportion of the part where there is no displacement caused to the region of the set detection area is large. For this reason, when template matching method is performed, the matching is done to match more to the part that is not displaced, and the sensitivity of displacement detection therefore becomes low.

Figure 10:
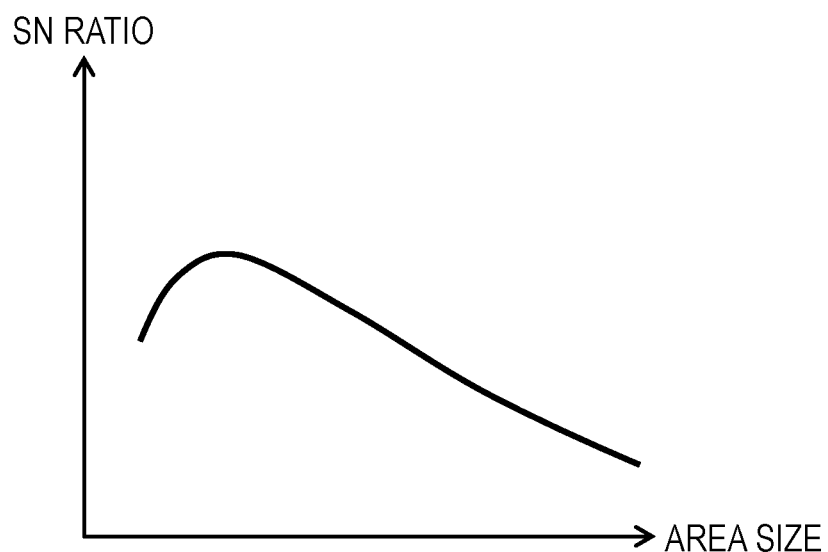
FIG. 10 is a diagram illustrating a relationship between the area size and a signal-to-noise (SN) ratio.

From the above, a relationship between the area size and an SN ratio (Signal-to-Noise ratio) is considered as shown in FIG. 10. FIG. 10 is a diagram illustrating the relationship between the area size and the SN ratio. With respect to FIG. 10, the vertical axis represents the SN ratio, and the horizontal axis represents the area size. As shown in FIG. 10, if the SN ratio has a peak, the area size corresponding to the peak position may be set as the size of the detection area. Alternatively, if the SN ratio has no peak, area size S3 where the noise level starts to increase in FIG. 8 may be set as the size of the detection area.

Controller 220 calculates the area size by any one of the above methods.

Next, controller 220 adjusts the calculated area size by using the actual length for one pixel, at individual points, obtained by spatial information obtaining unit 230.

Controller 220 adjusts the area size, depending on the spatial information (actual length for one pixel). Controller 220 sets, for example, a standard of 10 cm in actual length and adjusts the area size for each position of tire 121 by using the spatial information such that the area size (size in pixels) is equal to the size of the standard. This is because if the area size based on the same standard is not used, the displacement when the same weight is applied does not have the same value. That is, the area size is converted into the size in pixels corresponding to the actual length.

Figure 11A:
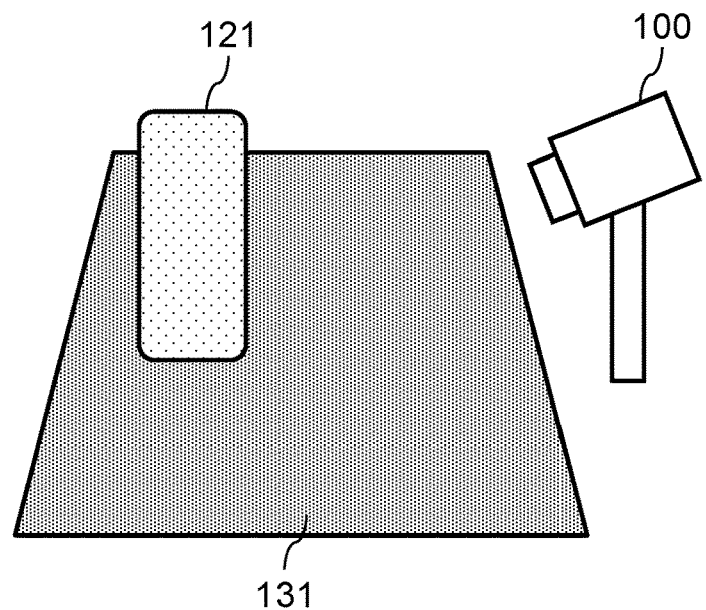
FIG. 11A is a diagram illustrating a positional relationship between an imaging device and a tire.
Figure 11B:
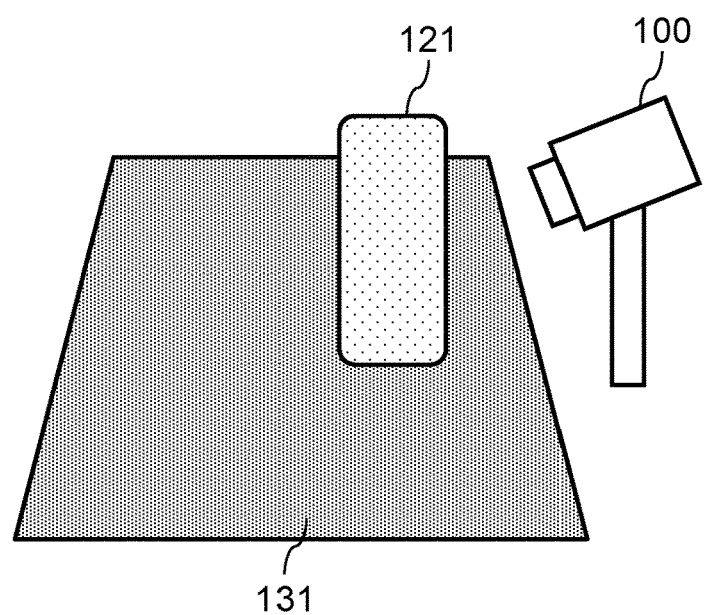
FIG. 11B is a diagram illustrating a positional relationship between an imaging device and a tire.
Figure 12A:
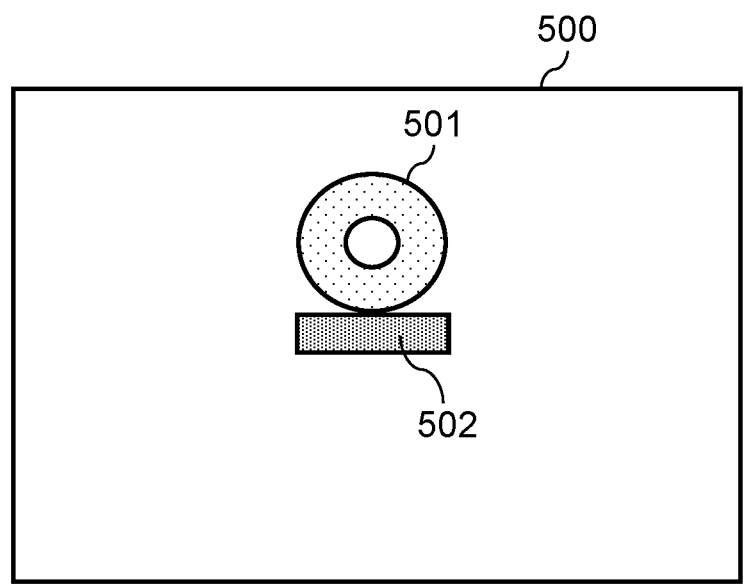
FIG. 12A is a diagram showing a captured image generated by the imaging device in the state of FIG. 11A.
Figure 12B:
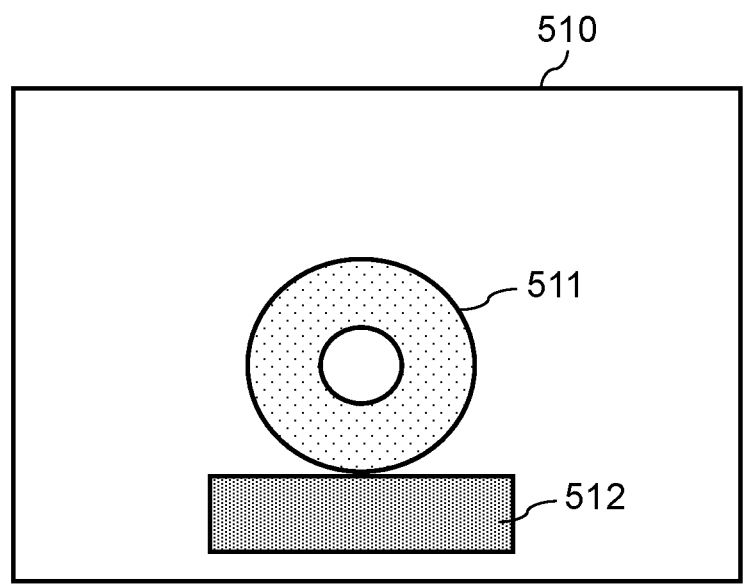
FIG. 12B is a diagram showing a captured image generated by the imaging device in the state of FIG. 11B.

FIGS. 11A and 11B are diagrams each illustrating a positional relationship between imaging device 100 and tire 121. FIG. 12A is a diagram showing a captured image where tire 121 is imaged by imaging device 100 in the state of FIG. 11A. FIG. 12B is a diagram showing a captured image where tire 121 is imaged by imaging device 100 in the state of FIG. 11B.

FIG. 11A shows that tire 121 is at a position distant from imaging device 100. FIG. 11B shows that tire 121 is at a position close to imaging device 100. Further, FIG. 12A shows captured image 500 generated by imaging device 100 in the state of FIG. 11A. FIG. 12B shows captured image 510 generated by imaging device 100 in the state of FIG. 11B. As shown in FIGS. 12A and 12B, depending on the distance between imaging device 100 and tire 121 at the time of imaging, tire 501 in captured image 500 is imaged smaller than tire 511 in captured image 510.

In the drawing, the position of tire 501 in FIG. 12A corresponds to the position of point F1 in FIG. 3. In addition, the position of tire 511 in FIG. 12B corresponds to the position of point F3 in FIG. 3. In this situation, assume that the actual length for one pixel, at each point, calculated by spatial information obtaining unit 230 is 3/5 cm at point F1 and for pixels in the vicinity of point F1, and is 3/20 cm at point F3 and for pixels in the vicinity of point F3. In this case, if the area size (height×width) is 3 cm×60 cm, the area size detection area 502 in captured image 500 is 5 pixels× 100 pixels, and the area size of detection area 512 in captured image 510 is 20 pixels×400 pixels. In FIG. 12A, the size of detection area 502 is 5 pixels×100 pixels, and in FIG. 12B, the size of detection area 512 is 20 pixels×400 pixels. Even if the sizes of detection areas 502, 512 are different on the captured image, the size of the region of the object whose displacement is to be detected can be the same for detection areas 502, 512 by adjusting the area size as described above.

With respect to captured image 500, displacement calculator 250 calculates the displacement by using only the image in detection area 502 in captured image 500. In addition, with respect to captured image 510, displacement calculator 250 calculates the displacement by using only the image in detection area 512 in captured image 510.

[2-3. Calculation of Axle Load]

Figure 13A:
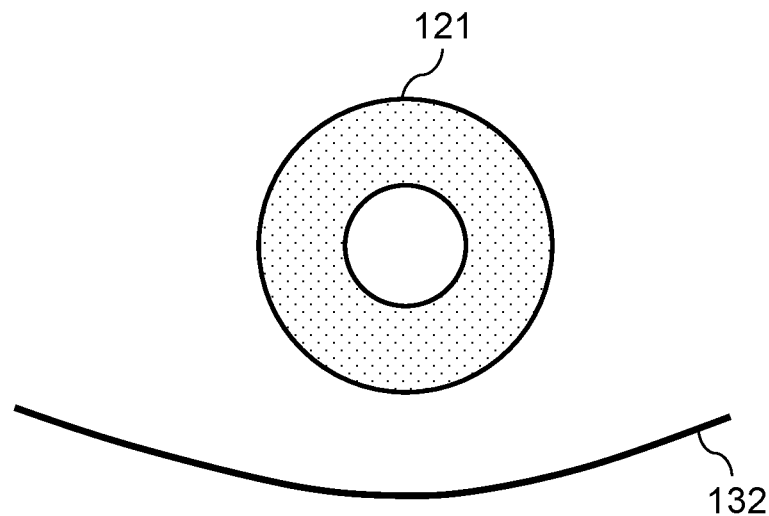
FIG. 13A is a schematic diagram illustrating an example of a road surface displacement caused by an axle load.

FIG. 13A is a schematic diagram illustrating an example of a road surface displacement caused by an axle load. FIG.

13B is a schematic diagram illustrating another example of a road surface displacement caused by an axle load.

Figure 13B:
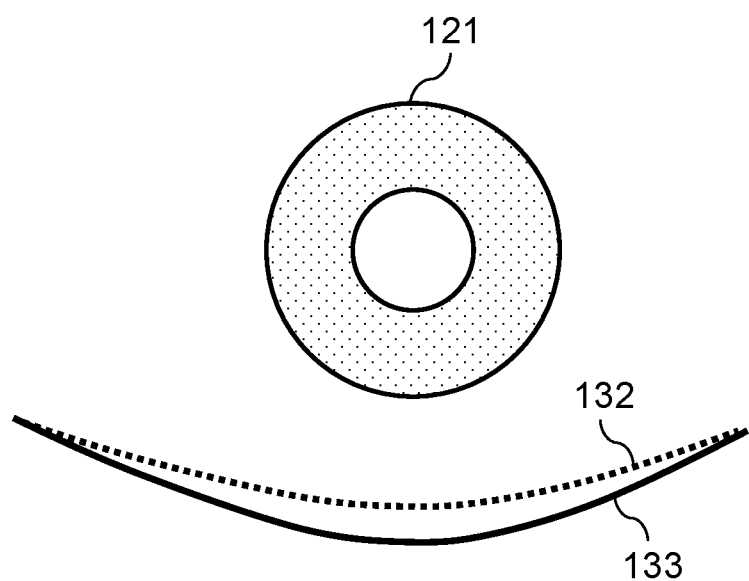
FIG. 13B is a schematic diagram illustrating another example of a road surface displacement caused by an axle load.

As shown in FIG. 13A, in road surface 132 where the vehicle is running, there is a displacement caused by a pressure, caused by the axle load of the vehicle, applied through tire 121. In this case, the pressure caused by the axle load depends on various conditions, and as shown in FIG. 13B, the road surface thus changes as shown by road surface 132 and road surface 133.

For example, even in the case of a vehicle having the same axle load, when the number of wheels on one axle or a tire diameter is different, the total contact area with the road surface is different. Thus, the pressure applied to the road surface varies, and as a result, the road surface displacement varies, too. Further, in the case where the road surface is paved, an elastic coefficient of the pavement depends on atmospheric temperature and road surface temperature. Therefore, the displacement when the same pressure is different. Further, when the vehicle is accelerated or decelerated at the position of imaging, the load acting on each axle depends on the acceleration. For example, the vehicle is braked, the load acting on the axle of the front wheel is increased.

Further, in the case that the vehicle vibrates depending on a condition of the road surface (road surface profile), the pressure applied to the road surface becomes higher at a moment when the vehicle sinks down. Thus, the load becomes larger in appearance. To the contrary, at a moment when the vehicle rises up, the pressure applied to the road surface becomes smaller. Thus, the load in appearance becomes smaller. Further, resistance force of the road surface itself with respect to weight is considered to be roughly separated into a static resistance force and a dynamic resistance force. Here, the dynamic resistance force is considered to be the vehicle speed at the road surface. For this reason, the road surface displacement can be different also depending on the vehicle speed.

A static load is necessary to calculate an axle load. However, since a load depends on a pressure as described above, the static load varies in appearance, depending on various conditions. Further, only a displacement of the road surface can be seen from a captured image.

From the above, axle-load calculator 270 corrects the displacement by using the displacement calculated by displacement calculator 250 and the information such as the state of the tire obtained by correction information obtaining unit 260, the temperature, and the vehicle speed, and axle-load calculator 270 then calculates the axle load

[2-3-1. Calculation of Axle Load by Using Relational Expression]

Axle-load calculator 270 may calculate the axle load by using a relational expression between the displacement and the axle load.

Specifically, axle-load calculator 270 calculates the axle load by using a displacement coefficient. As a displacement coefficient, it is possible to use a relational expression and a coefficient used in the relational expression, where the relational expression expresses the relation between the axle load and the displacement when the displacement is caused in road 130 due to the axle load of the wheel applied to road 130. Axle-load calculator 270 previously stores the relational expression and the displacement coefficient.

In general, an axle load w (kg) is expressed by a formula w=f(d), which is a function f of a displacement d. In the present disclosure, the function f is approximated as a linear function. As the relational expression, axle-load calculator 270 stores a linear function w=αd, where d is a variable, and α is the displacement coefficient.

The displacement coefficient α depends on types and compositions of asphalt and the like that constitute road 130. It is possible to determine the displacement coefficient α by previously causing a vehicle having a known axle load to run on road 130 to survey the relation between the axle load and the displacement of road 130 when the vehicle is running Axle-load calculator 270 stores the displacement coefficient α. Axle-load calculator 270 converts the displacement detected by displacement calculator 250 into the axle load of the vehicle.

[2-3-2. Calculation of Axle Load by Using Displacement Shape]

Axle-load calculator 270 may calculate the axle load from the displacement shape of road surface 131 calculated by displacement calculator 250.

Figure 14A:
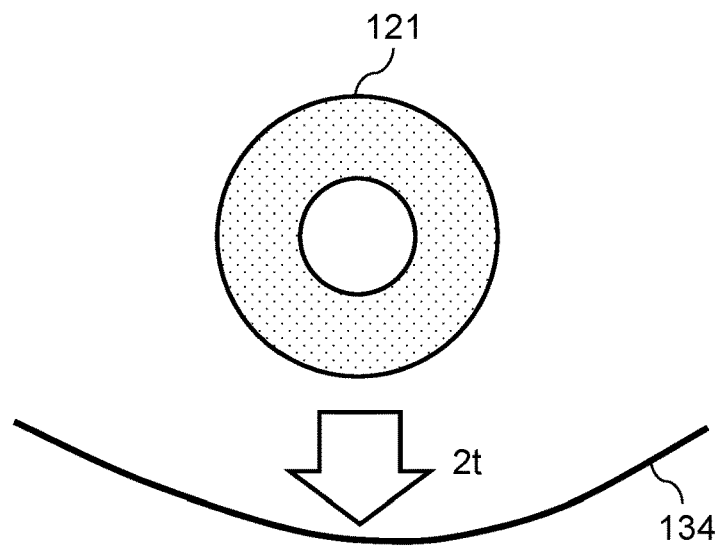
FIG. 14A is a schematic diagram illustrating an example of a road surface displacement that is a standard.
Figure 14B:
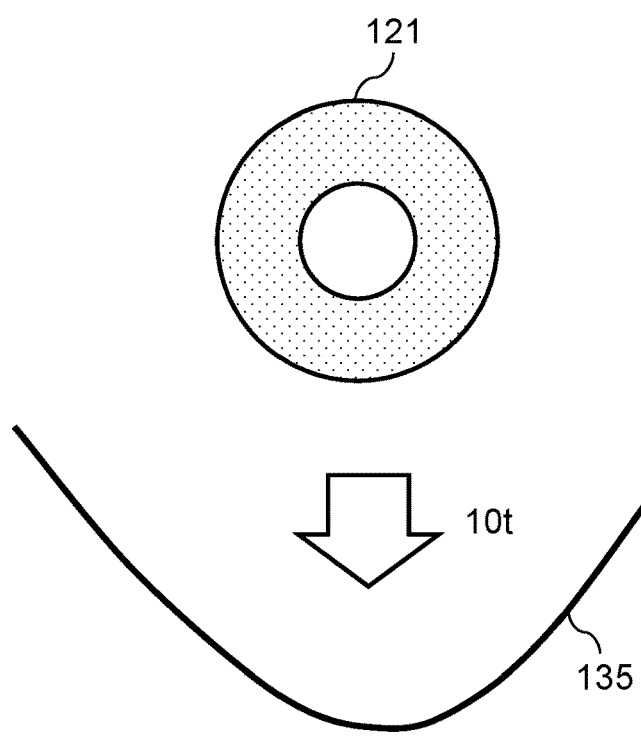
FIG. 14B is a schematic diagram illustrating a road surface displacement that is in a similarity relation to the road surface displacement of FIG. 14A.

FIG. 14A is a diagram showing an example of a road surface displacement that is a standard. FIG. 14B is a diagram showing an example of a road surface displacement that is in a similarity relation to the road surface displacement of FIG. 14A. FIG. 14A shows road surface 134 that is displaced due to the contact of tire 121. Assume that in the case of FIG. 14A, a weight of 2 t (tons) is applied to road surface 134 by tire 121. In comparison, FIG. 14B shows road surface 135 that is displaced due to the contact of tire 121. Assume that in the case of FIG. 14B, a weight of 10 t (tons) is applied to road surface 135 by tire 121.

Here, the contact area through which tire 121 is in contact with road surface 134 and the contact area through which tire 121 is in contact with road surface 135 are the same. In the case where the contact area is constant, the displacement shapes caused by the load of different weights are similar to each other if the road surface displacement is assumed to be proportional to the weight Specifically, if a standard deflection shape and the axle load for the standard deflection shape are stored in memory 280 in association with each other, the axle load of vehicle 120 can be calculated by calculating how many times the displacement shape of the displacement measured by displacement calculator 250 is as large as the standard deflection shape. In the case of FIGS. 14A and 14B, the displacement shape of road surface 134 of FIG. 14A and the axle load 2 ton are stored in memory 280 in association with each other, and it is then calculated how many times the displacement shape of road surface 135 of FIG. 14B is as large as the displacement shape of road surface 134. In this case, the calculation result is 5 times, and the axle load of the case of FIG. 14B is (2 t)×5=10 t.

Note that the axle load may be calculated as follows. Axle-load calculator 270 stores not the displacement shape of the road surface but the maximum value of the displacement or the average value of the displacement in a predetermined area and the axle load in memory 280 in association with each other, the axle load is calculated by comparing the maximum value of the displacement calculated by displacement calculator 250 or the average value of the displacement in the predetermined area with the stored value. Alternatively, the relation of the displacement shape may be expressed not by proportion but by a high-order function.

[2-3-3. Tire State]

Axle-load calculator 270 may correct the axle load by using the tire state. For the correction by using the tire state, it is necessary to know a spatial distribution of the road surface displacement caused by a vehicle. As the spatial distribution of the road surface displacement, it is possible to use a breadth of the road surface displacement measured from the captured image, possible to use a displacement shape of the road surface displacement measured by an FWD (Falling Weight Deflectometer), or possible to use a spatial distribution calculated by a simulation. Regarding correction of the tire state, the simplest way is that the road surface displacement is assumed to be a linear sum of the displacements of individual tires. In that way, it is possible to calculate the weight acting on each tire from the corresponding tire state. Of course, the displacement may be expressed not only in a linear form but also in an arbitrary form or in an arbitrary function.

Figure 15:
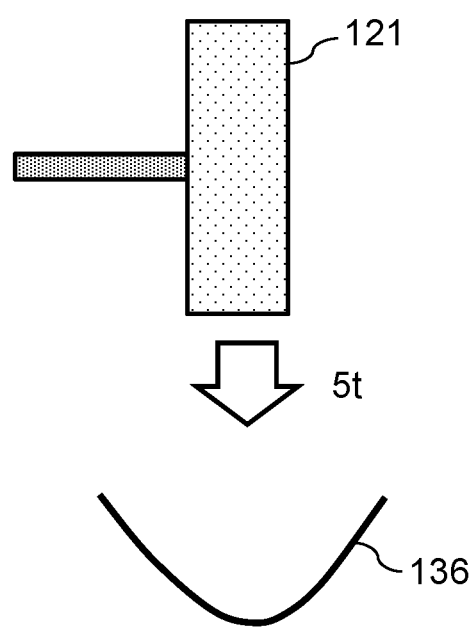
FIG. 15 is a schematic diagram illustrating a road surface displacement caused by a single tire.
Figure 16:
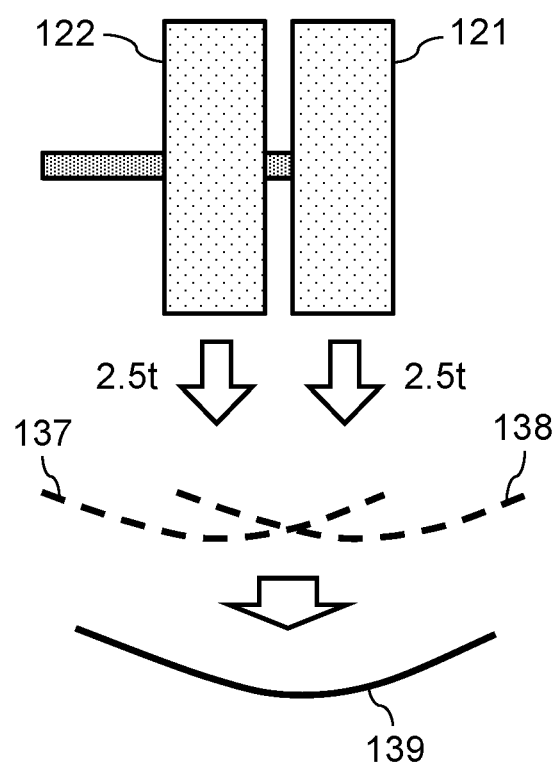
FIG. 16 is a schematic diagram illustrating a road surface displacement caused by a double tire.

In the following, with reference to FIGS. 15 and 16, a description will be given on how the road surface displacement is different depending on the number of tires of the wheel. FIG. 15 is a schematic diagram illustrating a road surface displacement caused by a single tire. FIG. 16 is a schematic diagram illustrating a road surface displacement caused by a double tire.

For example, in the case of a vehicle having the axle load of 10 tons, a wheel load of the wheel on one side is ideally 5 tons. In the case of the axle with single tires, the load of 5 tons is applied to road surface 136 of the road from one tire 121, and road surface 136 is displaced as shown in FIG. 15. In contrast, as shown in FIG. 16, in the case of double tires, the wheel load of 5 tons are applied to road surface 139 while being distributed to two tires 121, 122. This is because as the number of the tires attached to one axle is increased, the load acting on one tire decreases, and the road surface displacement accordingly decreases. The road surface displacement of the road in this case is road surface displacement 139 that is composition of road surface displacement 138 caused by load of 2.5 tons applied from tire 121 and road surface displacement 137 caused by load of 2.5 tons applied from tire 122.

As shown in FIGS. 15 and 16, although the axle load or the wheel load is the same, the displacement of the road is smaller in the case of the double tire than in the case of the single tire. This shows that the accuracy of measuring the axle load can be improved, for example, by changing the displacement coefficient $\alpha$ in the relational expression for converting the displacement into the axle load, depending on the number of tires of the wheel.

Here, when it is assumed that the measured road surface displacement is a linear sum of the displacement for each tire, the displacement is expressed as (Mathematical Expression 1).

$D(x)=w1 \times D1(x)+w2 \times D2(x+d)$ (Mathematical Expression 1):

where x is a distance from directly under tire 121 to imaging device 100, d is a wheel separation distance, w1 is a weight acting on tire 121, and w2 is a weight acting on tire 122. Further, D1 is a standard displacement function for tire 121, D2 is a standard displacement function for tire 122, and D is a composed displacement function. where x≥0. If x<0, the imaging device cannot image road surface 139, and the calculation of displacement does not have to be considered.

In Mathematical Expression 1, two of the weights w1, w2 acting on the tires are unknowns. Because the number of unknowns is two, the weights for tires 121, 122 can be calculated from Mathematical Expression 1 by measuring the displacement for each of two measurement points. Also in the case of two or more tires, the weight loaded on each tire can be calculated in a similar manner if the number of measurement points is increased in accordance with the number of unknowns (number of tires).

Here, if it is assumed that the axle load is evenly distributed to the individual tires attached to the same axle, an equation w1=w2 holds, and the number of unknowns is reduced. As a result, the number of measurement points can be reduced.

It has been described that if a plurality of tires are provided on one axle, the displacement of the one axle can be expressed as a linear sum of the displacements of the individual tires; however, other mathematical expressions can be used. For example, another function or a simulation may be used to estimate the parameters (weights) that can reproduce the composited displacement.

Figure 17:
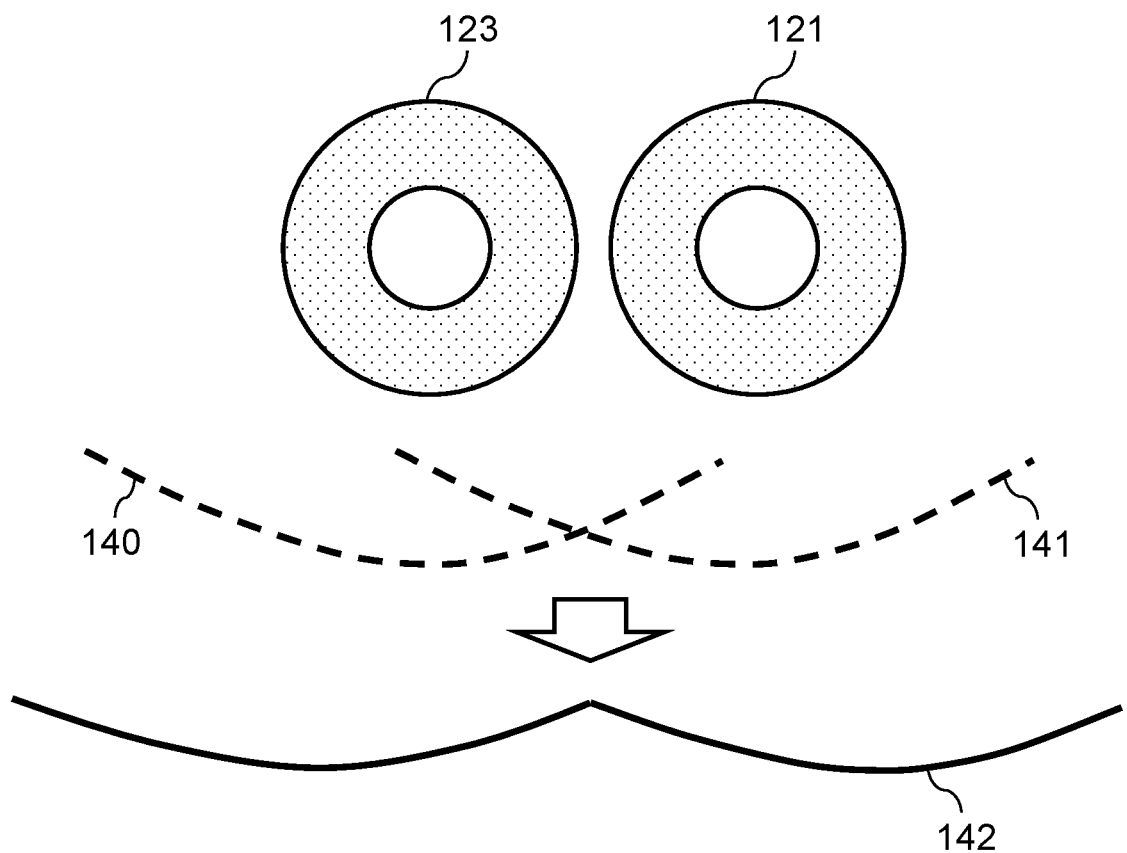
FIG. 17 is a diagram illustrating a relationship between a distance between axles and a road surface displacement.

Further, if the distance between the axles is small as shown in FIG. 17, the other axle affects more strongly. FIG. 17 is a diagram illustrating the relationship between the distance between the axles and the road surface displacement. In FIG. 17, tire 121 is the tire on the first axle, and tire 123 is the tire on the second axle. Thus, road surface displacement 140 caused by tire 121 and road surface displacement 141 caused by tire 123 affect each other, and the road surface displacement in this case is road surface displacement 142. Also in this case, the axle load can be calculated by using such a relational expression as above.

[2-3-4. Temperature]

Axle-load calculator 270 may correct the axle load by using an atmospheric temperature and a road surface temperature. The correction according to temperature may be performed in a manner similar to the correction when the deflection amount is measured with an FWD (Falling Weight Deflectometer). Alternatively, the correction may be performed by using a correction table generated by measuring the road surface displacements caused by a load object whose weight is known, at different temperatures.

Further, the road surface temperature may be set uniform or may be set in detail. When the road surface temperature is set in detail, correction may be performed by using a correction table storing correction coefficients corresponding to individual temperature ranges. If the correction table is stored in memory 280, the case of uniform temperature can be dealt with.

[2-3-5. Vehicle Speed]

Axle-load calculator 270 may use a speed of vehicle 120 to correct the axle load. It is also possible to correct the axle load by calculating a resistance value, based on a theoretical expression, from the speed of vehicle 120. Alternatively, it is also possible to correct the axle load by using a correction table generated from road surface displacements when a vehicle having a known weight is made to run at different speeds.

Alternatively, it is also possible to calculate an acceleration from the speed and to perform correction by using the acceleration. In this case, the axle load may be corrected by using a correction table storing correction coefficients corresponding to the calculated accelerations. The correction table is stored in memory 280.

[2-3-6. Contact Area of Tire]

Axle-load calculator 270 may correct the axle load by using a contact area through which the tire is in contact with the road surface. In the case of a single tire, the pressure applied to the road surface changes depending on the contact area of the wheel. Therefore, the road surface displacement also changes. For this reason, state determination unit 261 detects a type of the tire in addition to the number of the tires on one axle. Then, axle-load calculator 270 may change the displacement coefficient $\alpha$, depending on the number of the tires and the type of the tire.

A correction table may be generated by measuring road surface displacements that are caused by individual load objects each of which has a known weight, and correction may be performed by using the contact area. Further, a correction term may be calculated, depending on the contact area, based on the multilayer elasticity theory, based on other appropriate formulas, or based on a simulation using numerical analysis such as the finite element method.

[2-3-7. Movement of Vehicle]

A movement of a vehicle may be detected from captured images by using image processing, and correction may be performed depending on the movement. For example, if the vehicle is vibrating, a plurality of captured images may be used to obtain an average value of the road surface displacements caused by the movement, and the average value may be used as the road surface displacement. By calculating the average value as described above, it is possible to cancel the effects to the displacement when the vehicle body sinks down and rises up.

Note that, for axle-load measurement, you do not need to use the following captured images that may lower the accuracy of displacement calculation under the above various conditions. A captured image when acceleration is caused, and a captured image where the vehicle is rising up or sinking down.

[3. Advantageous Effect]

Axle-load measuring apparatus 200 according to the first exemplary embodiment measures an axle load of vehicle 120 by using a captured image where road 130 and vehicle 120 on road 130 are imaged, and axle-load measuring apparatus 200 includes displacement calculator 250, correction information obtaining unit 260, and axle-load calculator 270. Displacement calculator 250 detects a displacement of road 130 by using the captured image. The displacement is caused by receiving the axle load. Correction information obtaining unit 260 obtains correction information. The axle-load calculator 270 calculates the axle load by using the displacement and the correction information.

With the above configuration, it is possible to measure the displacement of a road surface, which can fluctuate in various conditions. Therefore, it is possible to improve the accuracy of measuring an axle load.

Other Exemplary Embodiments

As described above, the first exemplary embodiment has been described as illustrations of the technique disclosed in the present application. However, the technique in the present disclosure is not limited to the first exemplary embodiment, and is applicable to exemplary embodiments in which changes, replacements, additions, omissions, or the like are made as appropriate.

In the present disclosure, a road is imaged by using a single imaging device. However, a process similar to that in the present disclosure may be performed on a captured image generated by using a plurality of imaging devices, and the axle load may be calculated by using a final displacement calculated from a plurality of calculation results. Further, a plurality of captured images may be used. This can improve calculation accuracy.

Further, in a case where a tilt of imaging device 100 with respect to road surface 131 changes due to, for example, displacement of road surface 131, the tilt of imaging device 100 may be estimated, for example, from the position of imaging device 100 estimated by a global movement, a movement of a fixed point, a three-dimensional reconstruction, the SFM (Structure from Motion), or the like, and then the installation information stored in memory 280 may be corrected.

Further, state determination unit 261 of correction information obtaining unit 260 (see FIG. 2) may recognize a shape of a wheel of vehicle 120. Specifically, state determination unit 261 may recognize the shape of the wheel of vehicle 120 by image recognition by using the captured image obtained from imaging device 100. Then, state determination unit 261 may obtain, as the correction information, information indicating the number of the tires on one axle of vehicle 120 from the recognized shape of the wheel. Here, in general, the shape of a wheel for a single tire is different from the shape of a wheel for a double tire. Specifically, the wheel for a double tire has a concave shape, when viewed from outside, to allow two tires to be attached to one side of an axle. By recognizing the difference in the shape, state determination unit 261 can obtain the information indicating the number of the tires on one axle of vehicle 120.

In the present disclosure, axle-load measuring apparatus 200 has been described as an example of a configuration realized by a microprocessor executing a program stored in a memory in a computer including the microprocessor and the memory. However, the displacement measuring apparatus is not necessarily limited to a configuration example realized exactly in the same way as the above realized example as long as the displacement measuring apparatus has a function equivalent to the function of the above realized example. For example, axle-load measuring apparatus 200 may be an example of a configuration in which a part of or all of components constituting the displacement measuring apparatus are realized by a dedicated circuit.

Further, by using a semiconductor device such as an IC (Integrated Circuit) or an LSI (Large Scale Integration), the components (function blocks) in axle-load measuring apparatus 200 may each be realized as a single chip, or may be realized as a single chip containing a part or all of the components. Further, a method for circuit integration is not limited to the LSI, and may be realized by a dedicated circuit or a general-purpose processor. It is also possible to use an FPGA (Field Programmable Gate Array) that can be programmed after being subjected to LSI fabrication or to use a reconfigurable processor in which connections or settings of circuit cells in the LSI can be reconfigured. Further, when there emerges a technique for circuit integration that replaces the LSI as a result of the development of semiconductor technology or another technology derived from a semiconductor technology, the function blocks may be integrated by using that technique. There is a possibility that biotechnology can be applied.

Further, all or a part of various processes described above may be realized by hardware such as an electronic circuit, or may be realized by using software. Note that a process by software is realized in such a way that a processor included in axle-load measuring apparatus 200 executes a program stored in the memory. Further, the program may be recorded on a recording medium and may be distributed or circulated. For example, when the distributed program is installed in another apparatus including a processor and the program is executed by the processor, the apparatus can execute the above processes.

In addition, an exemplary embodiment realized by arbitrary combination of the components and the functions of the above-described exemplary embodiments is included in the scope of the present disclosure.

INDUSTRIAL APPLICABILITY

The present disclosure can be used for an axle-load measuring apparatus that measures an axle load of a vehicle from a captured image of the vehicle running on a road.

REFERENCE MARKS IN THE DRAWINGS 1 axle-load measuring system
100 imaging device
200 axle-load measuring apparatus
210 input/output interface
220 controller
230 spatial information obtaining unit
240 position detector
250 displacement calculator
260 correction information obtaining unit
261 state determination unit
262 temperature measuring unit
263 speed measuring unit
270 axle-load calculator
280 memory

The invention claimed is:

1. An axle-load measuring apparatus that measures an axle load of an axle of a vehicle by using a captured image where a road and the vehicle on the road are imaged, the axle-load measuring apparatus comprising:
   a displacement calculator that detects a displacement of the road by using the captured image, the displacement being caused by receiving the axle load;
   a correction information obtaining unit that:
     recognizes a shape of a wheel of the axle from the captured image,
     determines a number of tires on the axle from the recognized shape of the wheel, and
     obtains correction information indicating the determined number of tires on the axle; and
   an axle-load calculator that calculates the axle load by using the displacement and the correction information.

2. The axle-load measuring apparatus according to claim 1, wherein the correction information includes information indicating a temperature of the road.

3. The axle-load measuring apparatus according to claim 1, wherein the correction information includes information indicating a speed of the vehicle.

4. The axle-load measuring apparatus according to claim 1, wherein:
   the correction information obtaining unit determines whether or not the recognized shape is a concave shape, and
   in response to the determination that the recognized shape is the concave shape, the correction information obtaining unit determines that two tires are attached to one side of the axle, to obtain the correction information.

5. An axle-load measuring method for measuring an axle load of an axle of a vehicle by using a captured image where a road and the vehicle on the road are imaged, the axle-load measuring method comprising:
   detecting a displacement of the road by using the captured image, the displacement being caused by receiving the axle load;
   recognizing a shape of a wheel of the axle from the captured image;
   determining a number of tires on the axle from the recognized shape of the wheel;
   obtaining correction information indicating the determined number of tires on the axle; and
   calculating the axle load by using the displacement and the correction information.

6. The axle-load measuring method according to claim 5, further comprising:
   determining whether or not the recognized shape is a concave shape; and
   determining, in response to the determination that the recognized shape is the concave shape, that two tires are attached to one side of the axle, to obtain the correction information.

7. An axle-load measuring apparatus that measures an axle load of an axle of a vehicle by using a captured image where a road and the vehicle on the road are imaged, the axle-load measuring apparatus comprising:
   a displacement calculator that detects a displacement of the road by using the captured image, the displacement being caused by receiving the axle load;
   a correction information obtaining unit that recognizes a type of the vehicle from the captured image and obtains the correction information, based on the type of the vehicle; and
   an axle-load calculator that calculates the axle load by using the displacement and the correction information,
   wherein the correction information includes at least one piece of information selected from the group consisting of information indicating a width of a tire on the axle and information indicating a number of tires on the axle.

8. The axle-load measuring apparatus according to claim 7, wherein the correction information includes the information indicating the width of the tire on the axle.

* * * * *